United States Patent [19]
Lyons

[11] Patent Number: 5,881,436
[45] Date of Patent: Mar. 16, 1999

[54] PORTABLE LINE HARNESSING DEVICE

[76] Inventor: Thomas B. Lyons, 2093 Orchard Run, La Crescent, Minn. 55947

[21] Appl. No.: 878,256

[22] Filed: Jun. 18, 1997

Related U.S. Application Data

[63] Continuation of Ser. No. 561,362, Nov. 21, 1995, abandoned.

[51] Int. Cl.$^6$ .................................................. B65D 63/00
[52] U.S. Cl. .......................................... 24/16 R; 24/17 A
[58] Field of Search ................................ 24/16 R, 16 PB, 24/17 A, 17 AP, 625, 30.5 R; 248/74.3

[56] References Cited

U.S. PATENT DOCUMENTS

| | | |
|---|---|---|
| 2,438,362 | 3/1948 | Dunkelberger et al. . |
| 3,568,262 | 3/1971 | Woldman . |
| 3,819,139 | 6/1974 | Jemison . |
| 3,991,960 | 11/1976 | Tanaka . |
| 4,455,715 | 6/1984 | Matsui . |
| 4,728,064 | 3/1988 | Caveney . |
| 5,377,940 | 1/1995 | Cabe et al. . |
| 5,581,850 | 12/1996 | Acker .................................... 24/16 PB |

OTHER PUBLICATIONS

The 4" Wall Mount Lasso Organizer by Super Glue.

*Primary Examiner*—Peter M. Cuomo
*Assistant Examiner*—Hanh V. Tran
*Attorney, Agent, or Firm*—M. Paul Hendrickson

[57] ABSTRACT

Chorded lines such as ropes, electrical cords, etc. may be maintained in an orderly, untangled, coiled line bundle arrangement by a unique portable harnessing device. The harnessing device includes a flexible strap (such as a leather, woven fabric, etc.) fitted with an adjustable buckling assembly which may be looped about and adjustably sized so as to tautly harness a variety of different coiled line bundle sizes. Unbuckling the buckling assembly unharnesses the coiled line bundle so as to permit its removal from the harnessing strap. The device is equipped with an auxiliary harness which permits separate harnessing of a segmented portion of the line from the main coiled line bundle.

18 Claims, 3 Drawing Sheets

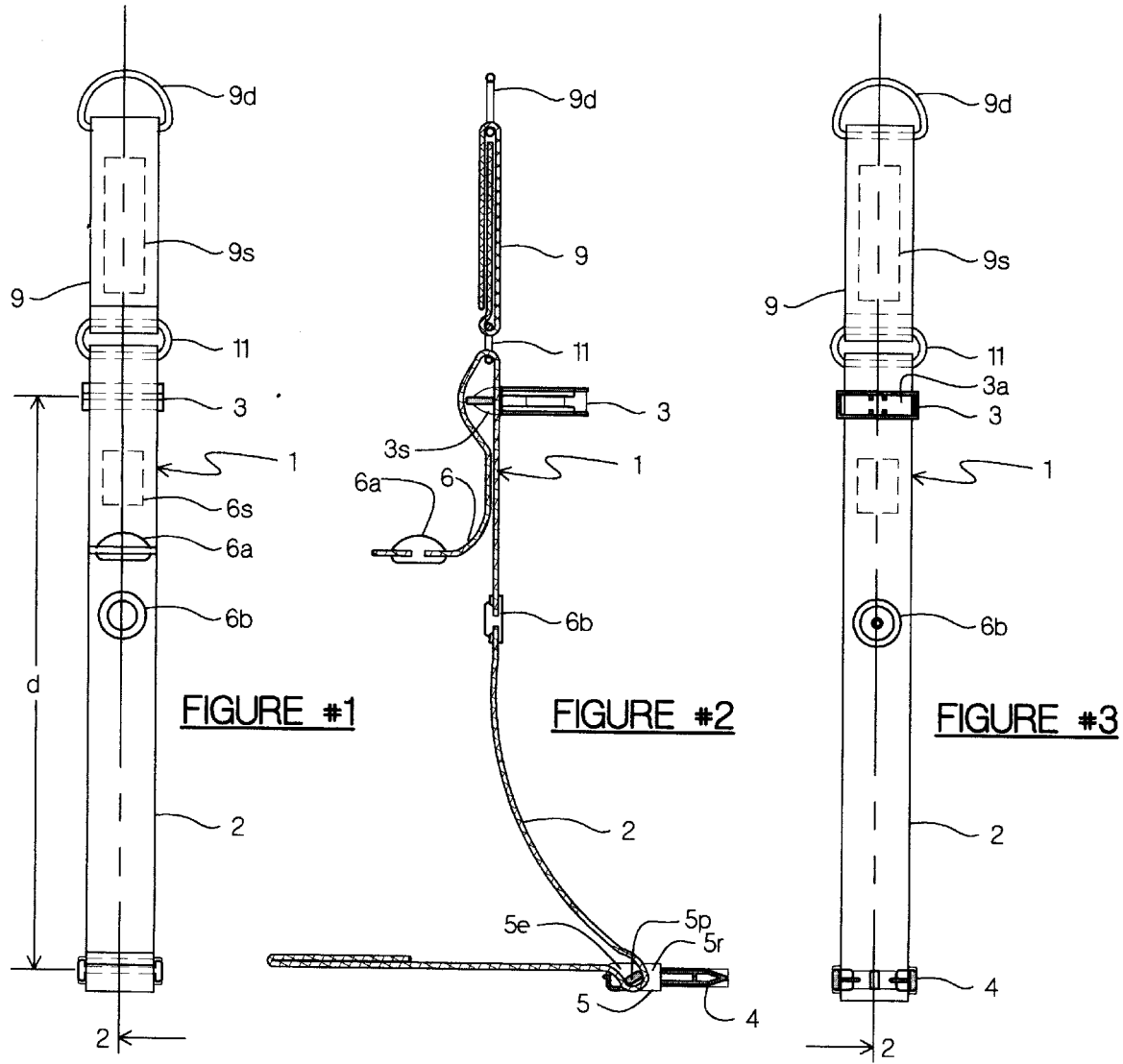

PORTABLE LINE HARNESSING DEVICE

This application is a continuation, of application Ser. No. 08/561,362, filed Nov. 21, 1995, now abandoned.

FIELD OF THE INVENTION

The present invention relates to a harnessing device and more particularly to a device for harnessing a line or a bundle of the line and its use.

BACKGROUND OF THE INVENTION

Numerous supple line materials such as ropes, cords, electrical conduits and cords, straps (leather, plastic, synthetic and natural wovens, etc.), tubing and conduits (e.g. plastic tubing, hoses such as garden hoses, etc.) necessitate for effective use an orderly arrangement. It is conventional to wind such line materials into a hand wound coil or reel which is then unwound when used. Reels for winding the line materials are used extensively to wind lines. Certain windings necessitate that a line end to be readily accessible. For example, in wound electrical cords, it is often desirable to segregate an electrical cord outlet from the coiled or wound cord so it becomes readily available for reuse. Although reels afford a convenient and orderly means of storing such electrical cords, reels are relatively cumbersome when used in the field. Another alternative system for maintaining line materials in an orderly wound or coil form entails tying a string or fastener about the coiled line. Tie strings, tie straps and tie wires (e.g. such as metal wires with a plastic or paper wrapping) are also another conventional technique for tying coiled cords, ropes, hoses, conduits and other line materials together.

The patent literature discloses numerous fastening devices for fastening bundles of flexible line materials together and anchoring the fastened material to a permanent structure. U.S. Pat. No. 3,819,139 to Jamison discloses a cable hanger strap equipped with a strap closure which interlockingly engages a strap head. Similarly, U.S. Pat. No. 5,377,940 to Cabe et al discloses a clamp for retaining electrical wires, fluid conduits, etc. to an anchoring site. A clamping device equipped with a hanger, a liner, a metal strap having a strap receiving collar to which an appropriate strap end is inserted, tightened about a bundle of wire and then bent backwards against the collar to secure the bundle therewithin is disclosed in U.S. Pat. No. 2,438,362 by Dunkelberger et al. Another anchorable cable clamp device for clamping together cable bundles is disclosed by U.S. Pat. No. 4,455,715 to Matsai. A pre-mountable bundling strap of an elongated strap body portion terminating in a tapered tongue and a tongue receiving aperture is disclosed in U.S. Pat. No. 3,568,262 to Woldman. U.S. Pat. No. 4,728,064 to Coveney discloses a releasable cable tie comprises of a laddered strap equipped with stud mount and releasable latch for latching onto the laddered strap.

A wall mount organizer commercially available under the LASSO trademark by Super Glue Corporation, Hollis, N.Y. 11423 may be used a hanger for coiled or wound lines such as a wound electrical cord. The wall mounted organizer consists of two major pieces, namely a detachable rigid bracket section and a slotted wall mount which contains a slotted port equipped with a latch for mounting and latching the bracket section thereto. The bracket section is a bracket equipped with two straps, one of which is permanently looped plastic tie down strap for threading an electrical cord outlet or inlet head therethrough. The other strap has one end which is molded to the bracket with the other end being open for detachable securing to the opposite bracket end. The detachable plastic strap includes a repetitive series of bulbous region and grooved recesses which, when wedged into a mating fastening receiver unit affixed to opposite bracket end, allows for a fixed adjustment of looping about the cord. The strap simply serves as a hanger and does not tautly retain or harness the cord bundle therewithin since the bracket is of a fixed size as are grooved recesses of the strap. Similar to muffler exhaust brackets, the rigid bracket size is sized so as to be useful for a particular sized cord. Thus, a two-inch diameter bundle cord bundle would require a two-inch bracket while a four-inch bracket would be required for a four-inch thick coiled cord. The rigid bracket section is designed for removal from the cord when the cord is in sue which, in turn, may lead to loss or inaccessibility of the bracket section for reuse.

SUMMARY OF THE INVENTION

The present invention provides a flexible harnessing device for separately securing together a line material and a segment of the line. The harnessing device comprises a pliable or supple major strap section equipped with a fastener securing unit and a detachable fastening unit positioned at different sites along the strap which, when fastened together, harness the line material therewithin. A strap adjusting member permits an expeditious adjustment in lateral distance between the fastener securing unit and the detachable unit. A separate auxiliary harness for harnessing a segment of the line end is attached to the strap section. A hanger attached to the strap section permits hanging of the device to a suitable anchoring site.

The fastening together of the fastener securing unit and the detachable fastening unit forms a loop for harnessing a cord, rope, conduit or other line material therewithin. By drawing the fastener securing unit and the detachable fastener unit closer together or further apart, an expeditious adjustment of loop size may, accordingly, be made. Thus, the loop size may be conveniently adjusted to the particular size of the line or lines to be harnessed by the harnessing device. A detachable fastening unit secured to the strap adjusting member affords a particularly effective arrangement for looping the strap about the line, then attaching the detachable fastening unit and the securing unit together and thereafter drawing a tightening strap end through the adjusting member until the strap is tautly drawn about the line material. This particular arrangement allows the harness embodiments to be finitely adjusted so as to tautly fit any line or coiled bundle of line size.

The effectiveness of the device for harnessing line materials may be illustrated by its use in harnessing and storing of an electrical extension cord. The harnessing device permits an electrical outlet to be separately harnessed in the auxiliary harness which, if desired, permits an electrical fixture to be connected to the outlet with or without unharnessing the outlet from the auxiliary harness. The coiled bundle of the electrical cord may be expeditiously unharnessed from the harnessing device by detaching the detachable fastening unit from the securing fastening unit to release the coil from the harnessing loop. The device is appropriately constructed of pliable materials which safely permits portions of the cord to be harnessed by the device when using the cord. Work site electrical extension cords are typically longer in length than needed at the job site. Uncoiling and using an excessively long cord while working can create hazardous working conditions. In use, the present device allows only the required and safe length of cord to be unwound from the device leaving the balance tautly wound and safely secured by the device. These features plus its pliable and unobstructional construction contributes towards a more safe working environment. After use the extension cord is wound into a coiled bundle which is then looped by the strap and harnessed within the loop by fastening the fastening securing unit and detachable fastening unit together. If necessary, the strap may be tautly drawn about the bundle or line by adjustment to the strap adjusting member. The hanger allows the device to be hung until reused.

BRIEF DESCRIPTION OF THE DRAWINGS

FIG. 1 depicts a top view of the harnessing device of this invention.

FIG. 2 is a cross-sectional view taken along line 2—2 of FIG. 1.

FIG. 3 is a bottom view of the device shown in FIG. 1.

DETAILED DESCRIPTION OF THE INVENTION

Figure 4:
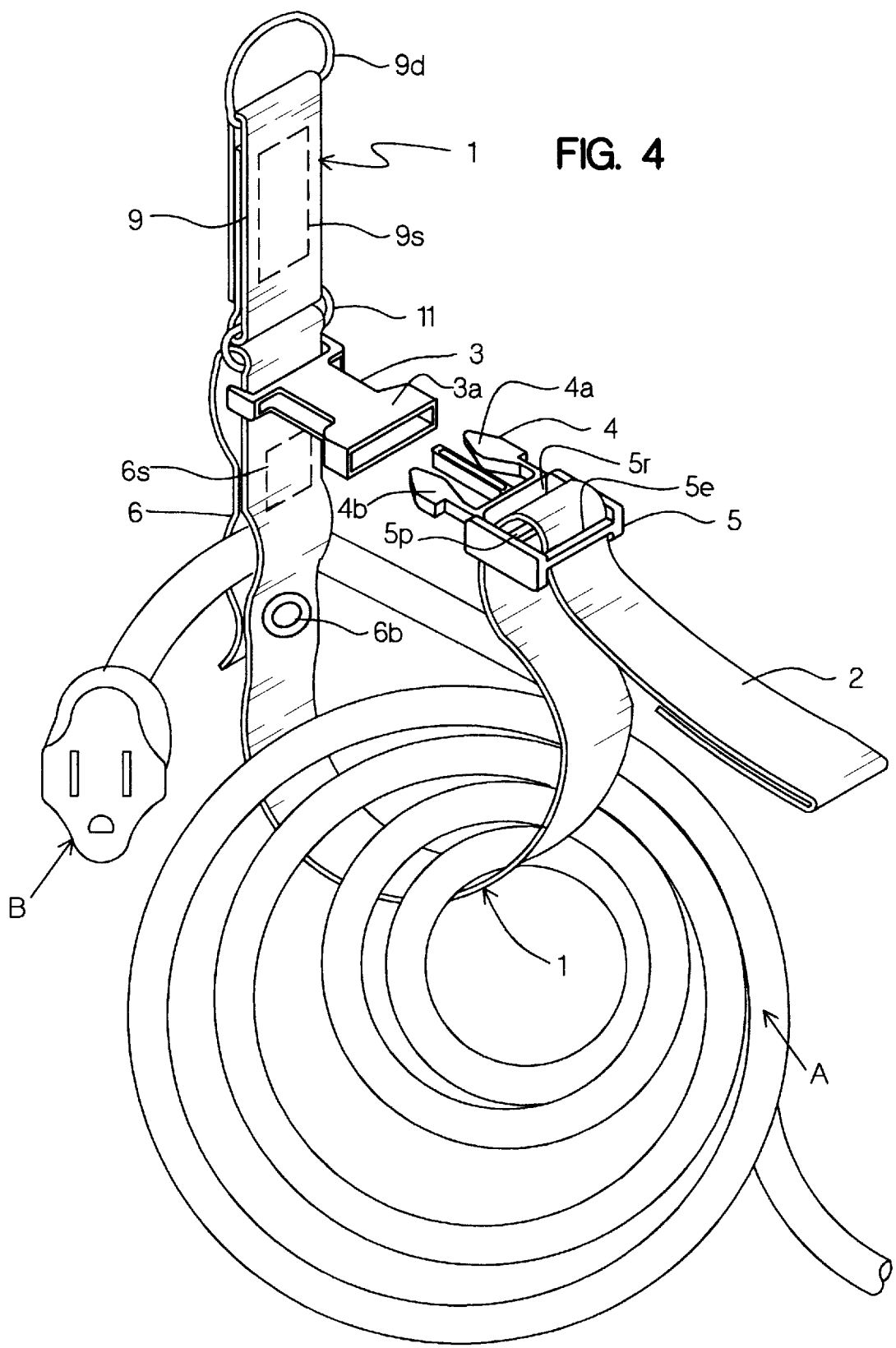
FIG. 4 depicts the use of the device shown in FIG. 1 for harnessing an electrical extension cord.
Figure 5:
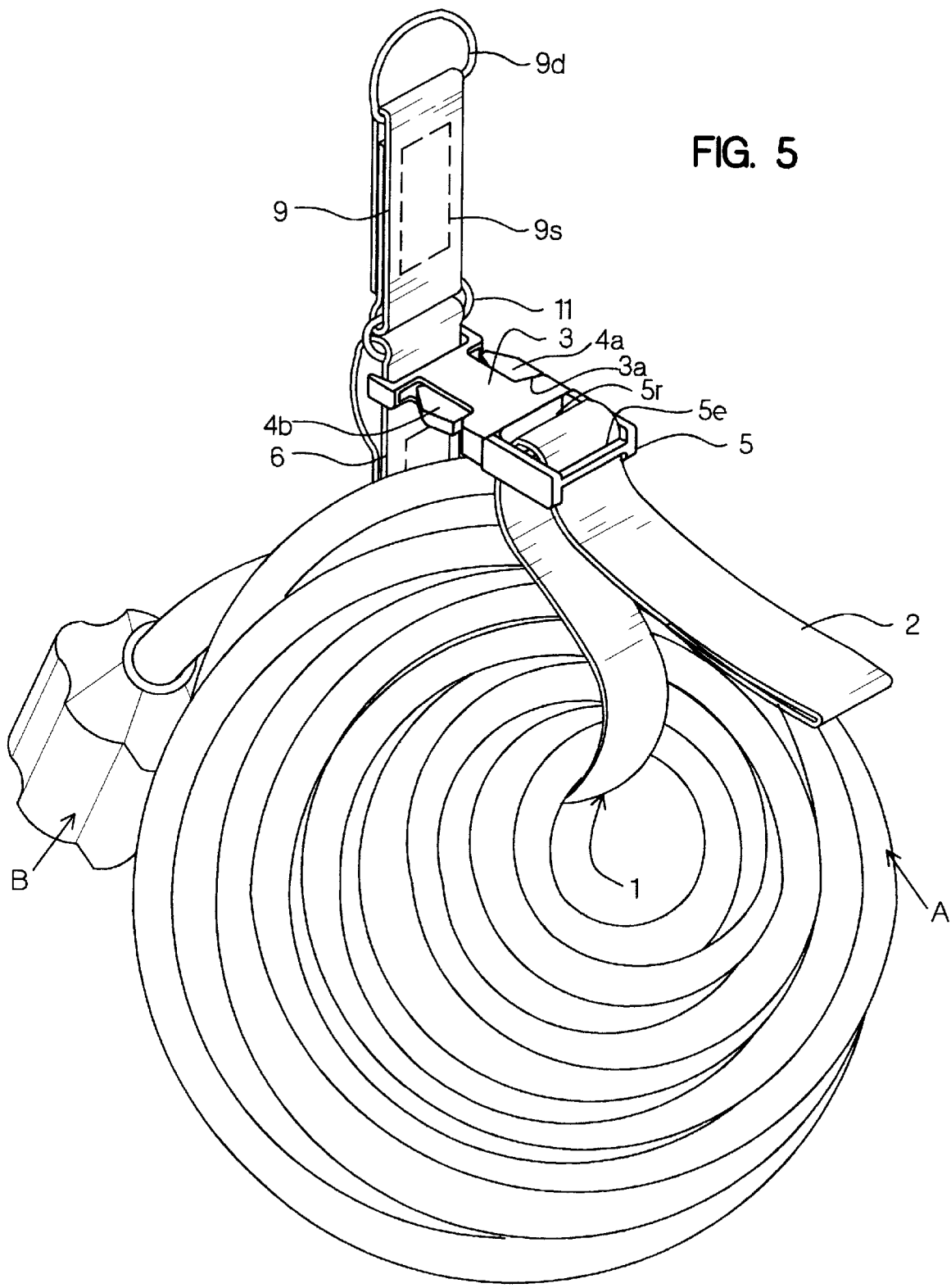
FIG. 5 depicts the device shown in FIG. 4 harnessing the electrical cord.

According to the present invention there is provided a flexible line harnessing device (generally designated as 1) for separately harnessing a line (generally referenced as A) and a segment of the line (referenced by B) comprising a main flexible strap section 2, a fastener securing unit 3 and a detachable fastening unit 4 positionally secured at different sites (designated in FIG. 1 as α and β for illustrative purposes) along the strap section 2 with the fastener securing unit 3 and detachable unit 4 when fastened together and drawn tautly onto the line A forming a closed looped strap (as shown in FIG. 5) for harnessing the line A therewithin and when unfastened forming an open strap (as depicted by FIGS. 1–4) for removing the line A therefrom, a strap adjusting member 5 for adjusting the size of the closed loop for the harnessed line A by adjusting a spatial distance (d as depicted in FIG. 1) of the strap between the fastening securing unit 3 and the detachable unit 4, and an auxiliary harness (generally designated as 6) attached to the strap 2 for separately harnessing therewithin the segment B of line A.

The present invention provides a supple line harnessing device 1 which permits separately harnessing a segment B of the line from a coiled bundle of the line A. As illustrated in FIGS. 4 and 5, the device 1 is particularly well adapted for use with line materials wherein it is desirable to segregate a segment B of the line A from a coiled line bundle such as with a wound or coiled electrical cord A wherein an inlet feed end or an outlet end B (as shown in FIGS. 4 and 5) is conveniently separated from the main coil A.

The harnessing device 1 comprises a main strap section 2 of a supple construction fitted with an adjustable fastening assembly (3, 4 and 5) which, when fastened together, form a looped harness for adjustably harnessing a coiled bundle of the line A as depicted in FIG. 5 and when unfastened opens the loop so as to permit the unharnessing of the coiled bundle A therefrom as illustrated by FIG. 4.

The main strap portion 2 also includes an auxiliary harness 6 secured to main strap 2 which allows for a segmented portion B of the line A such as electrical cord outlet end to be separately harnessed to the main strap 2. The auxiliary harness 6 (referred to also as a lateral harness) is appropriately fitted with a detachable fastener combination 6a and 6b preferably adjustable auxiliary harness adjusting means 6c. The auxiliary harness 6 may be effectively used to separately harness a segmented portion B of the line from main coil A which is particularly useful when unharnessing and partially withdrawing the line A therefrom as illustrated by FIG. 4. With reference to depicted use of the device 1 with an electrical extension cord, the plug-in end B of an electrical extension cord A may be left attached or harnessed to the auxiliary harness 6 so as to make the harnessing device 1 readily available when rewinding or recoiling and harnessing the wound or coiled line A within the device 1. Similarly, as illustrated in FIG. 4, only that portion of the harnessed electrical extension cord A needed for the specific task needs to be actually removed or unharnessed from the looped strap 2 leaving the balance orderly harnessed by the device 1.

The harnessing device 1 includes a fastening assembly (3 and 4) which may be appropriately adjusted by adjusting means 5 so as to tautly harness the coil A within the looped strap as depicted in FIG. 5. Any suitable adjusting means 5 for adjusting the loop size (d as depicted in FIG. 1) to fit the line A or wound line may be used for this purpose. The strap adjusting member 5 may generally comprise any adjusting means 5 such as the depicted cinching element 5 which permits the loop to be increased or decreased in size so as to permit tautly harnessing of line A to device 1. The strap adjusting member 5 may be affixed to the detachable fastening member 4 as shown in the figures, the securing member 3 (not shown) or separate therefrom such as an inline buckle (not shown) which serves as a tightening means 5 and permits an adjustment of the loop size d. A particularly effective adjustable fastening assembly (3 and 4 as depicted by the figures) includes detachable fastening member 4 fitted with an adjusting element 5 which permits the detachable fastening unit 4 to be variably adjusted (e.g. slideably adjusted to appropriate d as illustrated in FIG. 1) upon the main strap 2 to the desired looping size.

In the preferred embodiments of the invention as illustrated by the figures, the strap adjusting element 5 is affixed to the detachable fastening member 4. The illustrated strap adjusting element 5 comprises cinching element 5 having a strap retaining pin 5p bordering a strap receiving port 5r "(as depicted in the Figures and also referred to as strap receiving slot)" for receiving a looped strap 2 and a strap exiting port 5e (depicted in the Figures and also referred to as strap exiting clot) as depicted in FIGS. 4 and 5. The depicted device 1 allows the strap 2 to be slideably adjusted be feeding the strap 2 through the receiving port 5r about the pin 5p and the strap exiting port 5e, and to tighten the strap 2 by pulling the slack from the strap 2 through the exiting port 5e. The ability to readily tighten or slacken the loop size (d) by adjusting element 5 may be used to particular advantage when it is desired to use only a portion of the bundled cord A while retaining the balance still harnessed by the device 1. Simply by unfastening the detachable fastening unit 4 from the fastening securing unit 3 as depicted by FIG. 4, removing the line portion B from the harnessing device 1, reattaching the detachable fastening unit 4 to securing unit 3 and adjusting the strap adjusting element 5 so as to tautly harness the remaining line bundle A (as generally illustrated by FIG. 5), the harnessed cord, device 1 and unharnessed cord may be effectively used.

The depicted device 1 includes a hanger (generally designated as 9) comprised of hanger strap 9s equipped at one end with D ring 9d for hanging the device 1 to a suitable post such as a hook or nail. The hanger 9 is secured to strap section via an elongated steel O-ring 11. The hanger strap 9s, the auxiliary strap 6 and the strap section 2 may be appropriately constructed of any suitable pliable or supple material which imparts the desired flexibility structure to the device 1. Straps constructed of natural (e.g. canvas) or synthetic fibers (e.g. nylon, rayon, polypropylene, etc.) of an appropriate size such as commonly used in the manufacture of animal leashes and collars may be utilized for this purpose. Especially useful as strapping material is a nylon strap (e.g. about ½" to about 1" wide and about 1/32" to about 1/8" thick woven nylon strap) which may be folded, stitched and fitted with the associated components as illustrated in the Figures.

As may be observed from the Figures, the strap section 2 and the auxiliary strap 6 may be constructed of a single strap. This may be accomplished by threading the single strap at one end through strap bracket 3s and elongated O-ring 11, folding the single strap back onto itself and stitching the folded straps with stitches 6s. This arrangement allows strap bracket 3s and the associated fastener securing member 3 to slideably move between ring and stitches 6c. The depicted auxiliary strap 6 includes a metal snap fastener combination comprised of a detachable female snap 6a secured to auxiliary harness 6 with the mating male fastener 6b being secured to strap section 2 as shown in the drawings. This snap fastener combination 6a and 6b allows the auxiliary harnesses 6 to be readily harnessed and unharnessed from line segment B.

The opposite end of strap section 2 may be folded and secured together (e.g. stitching, clamps, heat-sealed, etc.) to form a strap section 2 convenient for threading through the strap adjusting means 5 as depicted by the figures. A suitable detachable fastening member 4 may be of a plastic construction equipped with two protruding latching heads 4a and 4b which, upon insertion to latching neck 3a of securing unit 3, are biasingly wedged inwardly until latching heads 4a and 4b clear latching neck 3a which, in turn, allows biased heads 4a and 4b to spring outwardly and latch onto latching neck 3a as shown in FIG. 5.

The device 1 provides an orderly arrangement of wound flexible lines A while affording an effective means for harnessing a line segment B from a wound line A. The detachable fastener assemblies 3, 4, 6a and 6b permit expeditious unfastening and removal of the line segment B from the auxiliary harness 6 and wound line A from looped strap 2. Complete removal or partial removal of wound line A from harnessing strap 2 and, if in the case of partial removal, a tightening of looped strap 2 so as to tautly harness a wound line of any size and configuration may be effectuated through use of harnessing device 1. The device 1 being suitably constructed of supple strap materials permits the device 1 to conform to the configuration of the work site and harnessed wound line A. Since the device 1, in the case of an electrical cord, may be safely retained and attached to the electrical cord, safety at the work site and accessibility for harnessing is provided by the present device 1. The device 1 may be universally utilized for a broad range of wound lines 1 with a versatility to adjust the device 1 to tautly harness any wound coiled line A size.

What is claimed is:

1. A flexible line harnessing device adapted to separately harness a coiled line of a flexible line from a segmented portion of the line so as to permit either the coiled line or the segmented portion to be separately unharnessed from the device, said device comprised of a flexible strap for looping about and harnessing the coiled line therewithin, a detachable fastening assembly secured to the strap with the fastening assembly when positioned in a fastened position forming a closed harnessing loop about the coiled line and when the assembly is positioned in an unfastened position opening the loop so as to permit unharnessing of the coiled line therefrom, a strap adjusting means for slideably adjusting the loop to a desired size for harnessing the coil therewithin and an auxiliary harness equipped with an overlapping strap extension secured to one end of the strap, and an auxiliary harness fastener combination comprised of a detachable fastener unit affixed at a distal end of the extension and a mating auxiliary fastener extending outwardly from said strap and said loop in an externally disposed relationship thereto so as to permit a separate closure of the auxiliary harness about the segmented portion when the extensions which is adapted to be looped about the segmented portion and fastened together by said auxiliary fastener combination and a separate opening of the separate closure by detaching the detachable auxiliary fastener unit therefrom.

2. The device according to claim 1 wherein the fastening assembly includes a first fastening unit and a detachable second fastening unit which fastens to the first unit to form the harnessing loop for the coiled line and unfastens from the first unit so as to permit the removal of the coiled line therefrom, with said harnessing loop when formed by the fastening together of the first fastening unit and second fastening unit being positionally segregated from the auxiliary harness so as to permit a separable harnessing and separable unharnessing of the coiled line from said closed loop.

3. The device according to claim 2 wherein the second unit comprises a flexible prong and the first unit comprises a prong receiving latch for latching the prong of the second unit at the fastened position.

4. The device according to claim 2 wherein the strap adjusting member includes a cinching element for slideably engaging the strap and retaining the harnessing loop at the desired coil size.

5. The device according to claim 2 wherein the first fastening unit is secured to the strap at a first securing site and the detachable second fastening unit is affixed to the strap adjusting member so as to permit for adjusting the loop to the desired size independently from said auxiliary harness.

6. The device according to claim 1 wherein the device includes a hanger for hanging the device upon a support, auxiliary harness fastener combination comprises a detachable female snap secured to the distal end of the strap extension and a mating male snap fastener affixed to the strap in an outwardly projecting position from the closed loop for snap fastening of the male snap fastener to the female snap.

7. A flexible harnessing device for separately harnessing a coiled line and a segment of the line so as to permit either the coiled line or the segment to be separately harnessed or unharnessed from the device, said device comprising a major flexible strap section, a fastener securing unit and a detachable fastening unit laterally positionable at adjustable sites along the strap section, with the fastener securing unit and the detachable unit when fastened together forming a closed strap loop for separately harnessing the coiled line therewithin and when unfastened forming an open strap for removing the coiled line therefrom, a strap adjusting means for variably adjusting the closed loop to a desired coiled line size by slideable adjustment of the fastening securing unit and the detachable unit to a desired lateral spatial distance therebetween so as to a taut harnessing of the coiled line therewithin, and an auxiliary harness positioned outside and laterally separately from the closed strap loop so as to permit the separate harnessing and separate unharnessing of the segment of the line from said coiled line, with said auxiliary harness including a strap extension of a sufficient length for separately looping about the segment and an auxiliary fastening assembly for fastening and unfastening the strap extension about the segment.

8. The device according to claim 7 wherein the strap adjusting means comprises a cinching element which slideably engages onto the strap section.

9. The device according to claim 8 wherein the strap adjusting means is affixed to the detachable fastening unit.

10. The device according to claim 9 wherein the strap adjusting means includes a strap receiving slot and a strap exiting slot separated by a strap biasing pin which upon threading of the strap through the receiving slot about the pin and exiting through the exiting slot permits tightening of the loop by a drawing upon a strap end exiting from the exiting slot and an anchoring of the strap against the pin when applying a biasing force upon the strap at an entering side of the receiving slot.

11. The device according to claim 8 wherein the auxiliary harness includes a detachable snap fastener combination comprises of a detachable female snap secured to a distal end of the strap extension and a mating male snap fastener affixed onto the strap section in an outwardly projecting position from said loop.

12. The device according to claim 7 wherein the strap adjusting means comprises a cinching element which, when upon drawing one strap end therethrough, tightens the strap about the coiled line and when drawing upon an opposing strap end loosens the strap about the coiled line.

13. A method for separately harnessing a coiled flexible line from an end segment of segment of the line in a line harnessing device so as to permit either the coiled line or the segment to be separately harnessed or separately unharnessed from the device, with said device comprised of a major flexible strap section, a fastener securing unit and a detachable fastening unit laterally positioned at adjustable sites along the strap section, with the fastener securing unit and the detachable unit when fastened together forming a closed strap loop for separately harnessing the coiled line therewithin and when unfastened forming an open strap loop for removing the coiled line therefrom, a strap adjusting means for variably adjusting the closed loop to a desired coiled line size by slideable adjustment of the fastening securing unit and the detachable unit to a desired lateral spatial distance for the harnessing of the coiled line therewithin, and an auxiliary harness positioned outside and laterally separated from the closed strap loop so as to permit the separate harnessing and separate unharnessing the end segment of the line from said coiled line, with said auxiliary harness including a strap extension of a sufficient length for separately looping about the segment and an auxiliary fastening assembly for separably fastening and unfastening the strap extension about the segment, said method comprising:

a) separating the end segment from the coiled line;

b) placing the coiled line in juxtaposition to the open strap;

c) independently harnessing the coiled line within the closed strap loop by fastening the detachable fastening unit and the securing unit together;

d) tautly tightening the strap about the coiled line within the closed loop to the desired size by slideably adjusting the spatial distance between the securing unit and the detachable unit; and e) separately harnessing an unharnessing the segmented end of the line by the fastening and the unfastening of the strap extension with said auxiliary fastening assembly.

14. The method according to claim 13 wherein the coiled line comprises an electrical cord equipped with a connecting end as the end segment and the method includes coiling the cord into a coiled electrical cord and the placing the open strap about the coiled cord followed by a separate step of harnessing of the coiled cord within the closed strap loop and a further separate step of harnessing of the connecting end to the auxiliary harness.

15. The method according to claim 13 wherein the strap adjusting means slideably engages the strap and includes a tightening means for tightening the strap by drawing upon an exiting portion of the strap exiting from the strap adjusting means and method includes the tautly tightening of the strap by drawing of the exiting portion of the strap until the strap tautly harnesses said coiled line therewithin and therafter separately harnessing the end segment to the auxiliary harness.

16. The method according to claim 15 which includes the additional step of initially unharnessing the end segment of the line from the auxiliary harness while retaining the coiled line tautly harnessed by said tightening means followed by the unharnessing of the coiled line from the closed strap loop, uncoiling a portion of the line from the coiled line to provide a partial coiled line of the line and thereafter harnessing the partial coiled line within the closed strap loop by tightening the strap about the partial coiled line.

17. The method according to claim 14 which includes the steps of coiling the line to form a coiled bundle of the line, and thereafter the placing of the coiled bundle of juxtaposition to the open strap, and thereafter tautly harnessing the coiled bundle within the closed strap loop by tightening of the strap about the coiled bundle.

18. The method according to claim 14 wherein the separately harnessing and the separate unharnessing of the end segment from the auxiliary harness is effectuated while retaining the coiled line tautly harnessed within the closed strap loop.

\* \* \* \* \*